(12) United States Patent
Hanks et al.

(10) Patent No.: US 7,636,280 B2
(45) Date of Patent: Dec. 22, 2009

(54) CALIBRATION OF LENS POSITION IN AN OPTICAL DISC DRIVE

(75) Inventors: D. Mitchel Hanks, Fort Collins, CO (US); Andrew L Van Brocklin, Corvallis, OR (US); Greg J. Lipinski, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 671 days.

(21) Appl. No.: 11/240,916

(22) Filed: Sep. 30, 2005

(65) Prior Publication Data

US 2007/0076086 A1    Apr. 5, 2007

(51) Int. Cl.
G11B 7/00    (2006.01)
B41J 2/435    (2006.01)

(52) U.S. Cl. .................................. 369/44.29; 347/224

(58) Field of Classification Search ....................... None
See application file for complete search history.

(56) References Cited

U.S. PATENT DOCUMENTS

| | | | |
|---|---|---|---|
| 4,332,022 A * | 5/1982 | Ceshkovsky et al. ..... | 369/44.28 |
| 5,020,045 A * | 5/1991 | Smart et al. .............. | 369/44.29 |
| 5,467,328 A | 11/1995 | Murakami et al. | |
| 5,828,644 A | 10/1998 | Gage et al. | |
| 6,125,008 A * | 9/2000 | Berg et al. ............... | 360/264.4 |
| 6,275,454 B1 | 8/2001 | Boutaghou et al. | |
| 6,487,161 B2 | 11/2002 | Maruyama et al. | |
| 7,268,796 B2 * | 9/2007 | Collins ....................... | 347/224 |
| 2004/0004912 A1 * | 1/2004 | Morishima ............... | 369/44.32 |
| 2005/0232113 A1 | 10/2005 | Van Brocklin | |
| 2006/0146664 A1 | 7/2006 | Van Brocklin | |

OTHER PUBLICATIONS

International Search Report for PCT/US2006/028945, mailed Jan. 2, 2007, 4 pages.

* cited by examiner

*Primary Examiner*—Peter Vincent Agustin
*Assistant Examiner*—Aneeta Yodichkas

(57) ABSTRACT

Disclosed are various systems, methods, and programs embodied in a computer readable medium for calibration of a lens position in an optical disc drive. In one embodiment, a method is provided that comprises manipulating a lens focus actuator to relocate the lens from a first position to a second position. The lens substantially focuses a laser onto the surface of the optical disc when in the second position. The method also comprises determining a first input setting delta to the lens focus actuator that corresponds to a predefined position offset of the lens. The first input setting delta is determined based upon a second input setting delta corresponding to a distance between the first position and the second position.

31 Claims, 3 Drawing Sheets

CALIBRATION OF LENS POSITION IN AN OPTICAL DISC DRIVE

BACKGROUND

Focus actuators in optical disc drives are driven to control the position of a lens relative to an optical disc. Accurate positioning of the lens above the surface of an optical disc ensures that digital data and optically visible labeling marks made on the disc are properly produced. Unfortunately, in optical disc drives, the gain of a typical focus actuator may vary as much as plus or minus 90%, and the resulting lens positioning error can prevent the data and labeling marks from being properly recorded.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
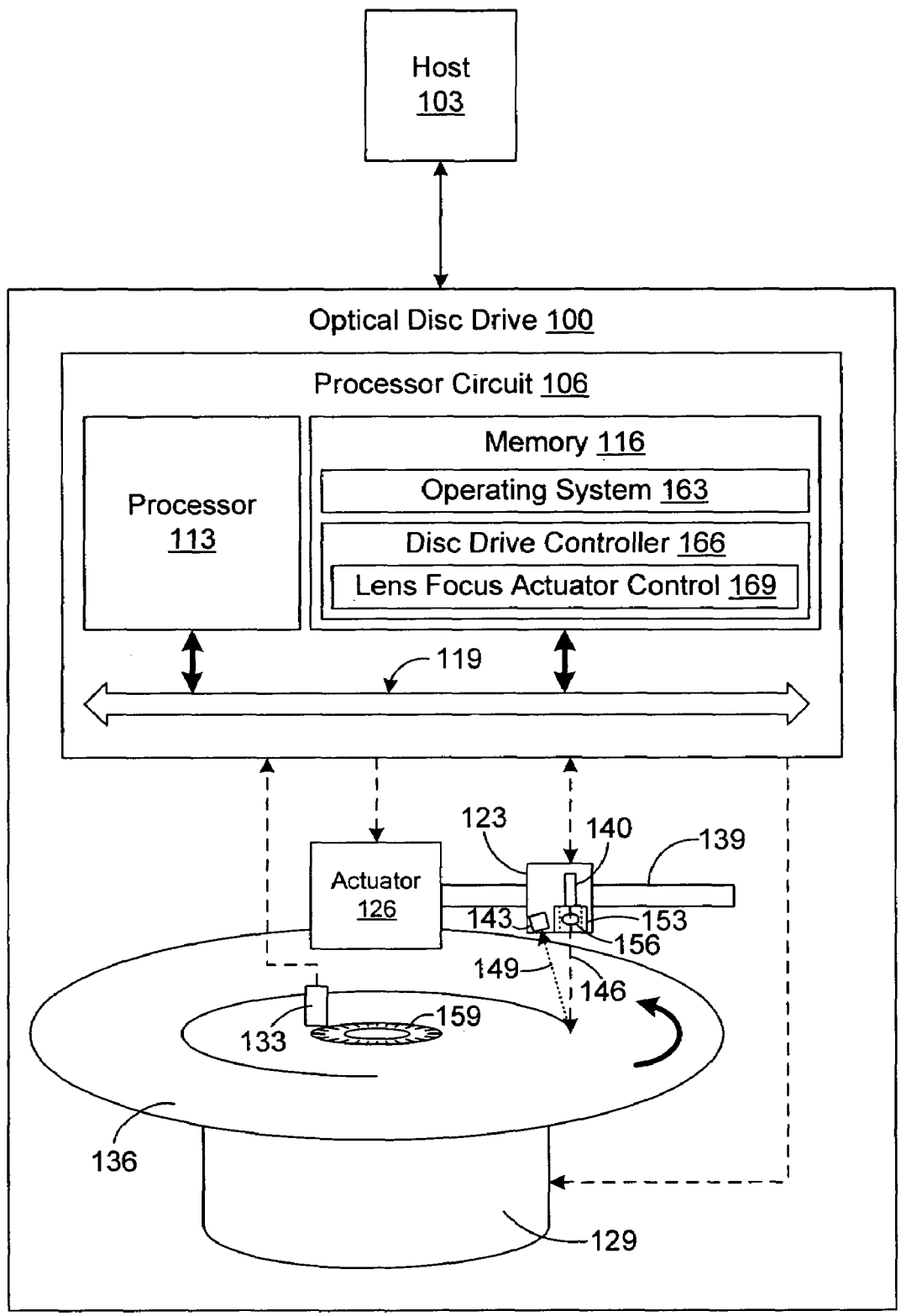
FIG. 1 is a block diagram of an optical disc drive according to various embodiments of the present invention.

With reference to FIG. 1, shown is an optical disc drive 100 according to an embodiment of the present invention. The optical disc drive 100 is in data communication with a host 103. In this respect, the host 103 may be, for example, a computer system, server, or other similar device. For the purposes of the following discussion, first the structural aspects of the optical disc drive 100 are discussed. Thereafter, the operation of the optical disc drive 100 is discussed with respect to the focusing of a lens associated with a laser of the optical disc drive 100 according to the various embodiments of the present invention.

In one embodiment, the optical disc drive 100 includes a processor circuit 106. The processor circuit comprises a processor 113 and a memory 116, both of which are coupled to a local interface 119. In this respect, the local interface 119 may be, for example, a data bus with an accompanying control/address bus as can be appreciated by those with ordinary skill in the art. The optical disc drive 100 further includes an optical pickup unit 123, an actuator 126, a spindle 129, and a positional sensor 133. When in use, an optical disc 136 is placed on the spindle 129 as shown. The optical pickup unit 123, actuator 126, spindle 129, and positional sensor 133 are all operatively or electrically coupled to the processor circuit 106. In particular, these components are coupled to the processor circuit 106 by way of an electrical connection through which electrical signals may be received from or transmitted by the processor circuit 106 in orchestrating the operation of the optical disc drive 100 as will be described. In one implementation, the optical pickup unit 123, actuator 126, spindle 129, and the positional sensor 133 are coupled to the local interface 119 through appropriate interface circuitry (not shown) as can be appreciated.

The actuator 126 may comprise, for example, a stepper motor or other such device. The actuator is operatively coupled to the optical pickup unit 123, for example, using a screw shaft 139. In this respect, the actuator 126 may be manipulated by the processor circuit 106 in order to move the optical pickup unit 123 back and forth along the length of the screw shaft 139 during the normal operation of the optical disc drive 100 as will be described. In this respect, the actuator 126 positions the optical pickup unit 123 relative to the optical disc 136 during the normal course of operation of the optical disc drive 100. Alternatively, other approaches may be employed to move the optical pickup unit 123 as desired other than a screw shaft 139.

The optical pickup unit 123 includes a laser 140 and a sensor 143 that may be employed to read data from the optical disc 136. In this respect, the laser 140 is controlled to generate laser light 146 that is directed to the optical disc 136. The laser 140 may operate at any one of a number of frequencies as can be appreciated by those with ordinary skill in the art. At least a portion of the laser light 146 may reflect off the optical disc 136 as reflected laser light 149. Data structures are embodied in the optical disc 136 that reflect the laser light 146 as can be appreciated by those with ordinary skill in the art.

The optical pickup unit 123 further comprises a lens focus actuator 153 that controls the focus of a lens 156. In this respect, the lens focus actuator 153 adjusts the position of the lens 156 in relation to the optical disc 136 in response to a position signal, value, or other input setting as will be described. The lens focus actuator 153 is operatively coupled to the processor circuit 106 that provides the positioning signal or data to the lens focus actuator 153.

The sensor 143 detects reflected laser light 149 during a read operation and generates a voltage signal that is applied to the processor circuit 106. The magnitude of the voltage signal generated by the sensor 143 is generally proportional to the magnitude of the incident reflected laser light 149 that falls upon the sensing surface area of the sensor 143. Alternatively, a current signal may be generated by the sensor 143. The sensor 143 may be a single sensor or multiple sensors operating cooperatively. Where multiple sensors are employed as the sensor 143, the voltage signal may be a sum of all of the voltage signals from each of the multiple sensors. Such a signal may be referred to as a "sum signal".

The optical pickup unit 123 may be manipulated to write data to the optical disc 136 by controlling the laser 140 in the optical pickup unit 123 so as to form the data structures in the optical disc 136. The writing capabilities of the optical disc drive 100 may also be employed to write a label on a label surface of the optical disc 136. Specifically, in one embodiment the label surface of the optical disc 136 is chemically treated so as to change an optical property such as darkness, reflectivity, or color upon being irradiated with laser light from the optical pickup unit 123. Such treatment includes, for example, a coating of thermo-chromic material that has been screen-printed on the label surface such that this material changes from light to dark color when activated by laser light 146 from the laser 140. The thermo-chromic material may comprise, for example, a mixture of color-forming dye, activator, and infrared antenna contained in a polymer matrix. The infrared antenna absorbs the laser energy and converts it to heat. The heat causes the activator, dye, and the polymer matrix to melt, thereby allowing the activator to interact with the dye. The interaction results in a chemical change to the dye that causes a change in color. The label material may vary slightly from manufacturer to manufacturer or from one disc to another disc, or even from one region on a disc to another region on the same disc. As a consequence, the appearance of the generated label may vary accordingly.

Also, as contemplated herein, the term "label" refers to an entire label or any portion thereof written to the surface of the optical disc 136.

The spindle 129 comprises a motor or other such device that spins the optical disc 136. This motor may be, for example, a stepper motor or other type of motor. In this respect, the optical disc 136 is placed in a seating position relative to the spindle 129. Thereafter, the optical disc 136 may be spun relative to the optical pickup unit 123 and the positional sensor 133. The positional sensor 133 obtains positional data 159 from the optical disc 136 as it rotates on the spindle 129. By virtue of the positional data 159 and the stepper motor control, the precise location of the optical pickup unit 123 relative to the optical disc 136 can be tracked during the operation of the optical disc drive 100.

The optical disc drive 100 further comprises a number of components stored in the memory 116 and executable by the processor 113 in order to control the operation of the various components of the optical disc drive 100. These components comprise, for example, an operating system 163 and a disc drive controller 166. The disc drive controller 166 is executed by the processor 113 to control the various operations of the optical disc drive 100. In this respect, the disc drive controller 166 orchestrates the general operation of the optical disc drive 100 in writing data to and reading data from optical discs 136. The disc drive controller 166 also orchestrates the operation of the optical disc drive 100 in writing a label on a surface of an optical disc 136.

A component of the disc drive controller 166 is lens focus actuator control 169. The disc drive controller 166 includes other components executed to control the operation of the optical disc drive 100 as can be appreciated. The lens focus actuator control 169 is executed as a portion of the disc drive controller 166 to control a positioning of the lens 156 to focus the laser 140 as desired. In one embodiment, the optical pickup unit 123 is coupled to the local interface 119 with an interface circuit that includes a register that holds a digital value that controls the positioning of the lens 156 by the focus actuator 153. In one embodiment, the digital value is converted to an analog voltage that drives the focus actuator 153 and determines the actual displacement of the lens 156 relative to the optical disc 136. In this respect, the value written to the register in such an interface circuit represents a laser focus setting.

In one embodiment, the focus actuator 153 responds to the voltage signal to displace the lens 156 from a rest position. The displacement of the lens 156 may be approximately proportional to the voltage applied to the focus actuator 153. Alternatively, the focus actuator 153 may be controlled in some other manner as can be appreciated.

Where embodied in the form of software or firmware, the disc drive controller 166 and the lens focus actuator control 169 may be implemented using any one of a number of programming languages such as, for example, C, C++, Assembly, or other programming languages. The disc drive controller 166 as may be implemented, for example, in an object oriented design or in some other programming architecture. Where any portion of the disc drive controller 166 and/or the lens focus actuator control 169 is represented in a flow chart herein, assuming that the functionality depicted is implemented in an object oriented design, for example, then each block of such flow charts may represent functionality that is implemented in one or more methods that are encapsulated in one or more objects, etc.

The memory 116 may comprise, for example, random access memory (RAM), such as, for example, static random access memory (SRAM), dynamic random access memory (DRAM), or magnetic random access memory (MRAM) and other such devices. In addition, the memory 116 may also include, for example, read-only memory (ROM) such as a programmable read-only memory (PROM), an erasable programmable read-only memory (EPROM), an electrically erasable programmable read-only memory (EEPROM), or other like memory device.

In addition, the processor 113 may represent multiple processors and the memory 116 may represent multiple memories that operate in parallel. In such a case, the local interface 119 may be an appropriate network that facilitates communication between any two of the multiple processors, between any processor and any one of the memories, or between any two of the memories etc. The processor 113 may be of electrical, optical, or molecular construction, or of some other construction as can be appreciated by those with ordinary skill in the art.

The operating system 163 is executed to control the allocation and usage of hardware resources such as the memory, processing time and peripheral devices in the optical disc drive 100. In this manner, the operating system 163 serves as the foundation on which applications depend as is generally known by those with ordinary skill in the art.

Next, the general operation of the optical disc drive 100 in writing a label to an optical disc 136 is described according to an embodiment of the present invention. The disc drive controller 166 controls the operation of the various components of the optical disc drive 100 in order to write a label onto the surface of the optical disc 136. The disc drive controller 166 also controls the operation of the various components of the optical disc drive 100 when writing data to and reading data from the optical disc 136.

To the extent that the disc drive controller 166 orchestrates the operation of the various components of the optical disc drive 100 in order to write a label onto the surface of the optical disc 136, it controls the movement of the optical pickup unit 123 by manipulating the actuator 126 to cause the optical pickup unit 123 to move along the screw shaft 139 as needed to select a radial position for the laser beam impinging on the optical disc 136. In addition, the disc drive controller 166 controls the rotation of the optical disc 136 by controlling the speed of the spindle 129. Also, the disc drive controller 166 can control the read and write functions of the optical disc drive 100 by manipulating the optical pickup unit 123 to transmit laser light 146 to the optical disc 136. When the optical pickup unit 123 reads data from the optical disc 136, then the reflected laser light 149 is sensed by the sensor 143 and a corresponding signal is generated that is applied to the processor circuit 106 through an appropriate interface circuit.

The disc drive controller 166 also tracks the angular position of the optical disc 136 based upon inputs from the positional sensor 133. In one embodiment, the positional sensor 133 senses the passing of positional data 159 in the form of spokes disposed on the optical disc 136 near, for example, the center, although the spokes may be located at some other location on the optical disc 136. Each time a spoke passes the positional sensor 133, the positional sensor 133 generates a pulse that is received by the disc drive controller 166 by way of the local interface 119. In this respect, each pulse may be viewed as a signal or an interrupt that informs the disc drive controller 166 of a certain amount of rotation of the optical disc 136. To track the actual location of the optical disc 136 based upon the pulses, the disc drive controller 166 may include a counter that counts the pulses up to a total number of pulses in a single rotation to determine the actual position of the optical disc 136 at a given time.

Thus, the angular location of the laser beam 146 generated by the optical pickup unit 123 relative to the optical disc 136 may be determined at any given time by virtue of the positional data tracked by the disc drive controller 166 based upon the data generated by the positional sensor 133. In particular, the location of the optical pickup unit 123 relative to a predefined position on the optical disc 136 of each pixel or segment of a label that is to be written to the optical disc 136 may be calculated based upon the relative positions of each of the spokes 159 sensed by the positional sensor 133. For example, in one embodiment, the disc drive controller 166 tracks the passing of each of the spokes 159 as the optical disc 136 rotates, thereby tracking the angular rotation of the optical disc 136.

By virtue of the above-mentioned components, the disc label controller 163 orchestrates the writing of a label on a writable surface of the optical disc 136. In this respect, the label to be written to the circular optical disc 136 may be embodied in the form of radial data that comprises a number of concentric and adjacent circular tracks, or that comprises a spiral.

For the optimum writing of labels to the optical disc 136, it has been discovered that the lens 156 should not focus the laser light 146 directly onto the writing surface of the optical disc 136, as is the case when writing digital data to the disc 136. Rather, label writing is more effective if the lens is positioned at a predefined offset distance from the focal position with respect to the surface of the optical disc 136. Specifically, when the lens 156 is located at the approximate focal position with respect to the surface of the optical disc 136, the distance from the center of the lens 156 to the surface is approximately equal to the focal length of the lens 156.

Thus, it may be said that the most desirable position for the lens 156 in order for the most effective writing of a label is such that the lens 156 is slightly out of focus with respect to the optical disc 136. Given that the optimal positioning of the lens 156 is when the lens is slightly out of focus with respect to the optical disc 136, then it is necessary to adjust the position of the lens 156 by the predefined offset so that it is optimally placed for writing the label to the optical disc 136 during the label writing process. The actual offset from the focal position that should be applied may be determined by appropriate experimentation as can be appreciated.

Unfortunately, several factors may prevent an accurate positioning of the lens 156. Specifically, the lens focus actuator 153 has a particular gain that can be determined based on the reflected laser light 149 that is detected by the respective sensor 143 or sensors 143 as described above. This gain may change over time given the change in various relevant physical conditions and manufacturing process variation as can be appreciated. Consequently, recalibration of the position of the lens 156 by the lens focus actuator 153 is performed periodically during the writing of a label to the surface of the optical disc 136.

In particular, in order to position the lens 156, in one embodiment the lens focus actuator 153 responds to a value placed in an appropriate register or other memory location that dictates the ultimate position of the lens 156. In this respect, the value that is placed in such a register or other memory location may vary from a low value to a high value. Such a range may include any number of discrete values such as, for example, from 0 to 255, etc. More or less discrete points may be employed depending on the desired resolution of the focusing of the lens 156 as can be appreciated. The value placed in the respective register or memory location is defined herein as an "input setting".

Thus, various input settings may be placed into the respective register to control the positioning of the lens 156 by the lens focus actuator 153. In one embodiment, the input setting is a digital value that is converted into an analog voltage or current by a digital-to-analog converter. The analog voltage or current may be applied to the lens focus actuator 153. The lens focus actuator 153 is configured to respond to the analog value by positioning the lens 156. In one embodiment, the lens 156 is in a rest position when the digital value placed into the respective register is an end value such as, for example, "0" or "255" as mentioned above.

Figure 2:
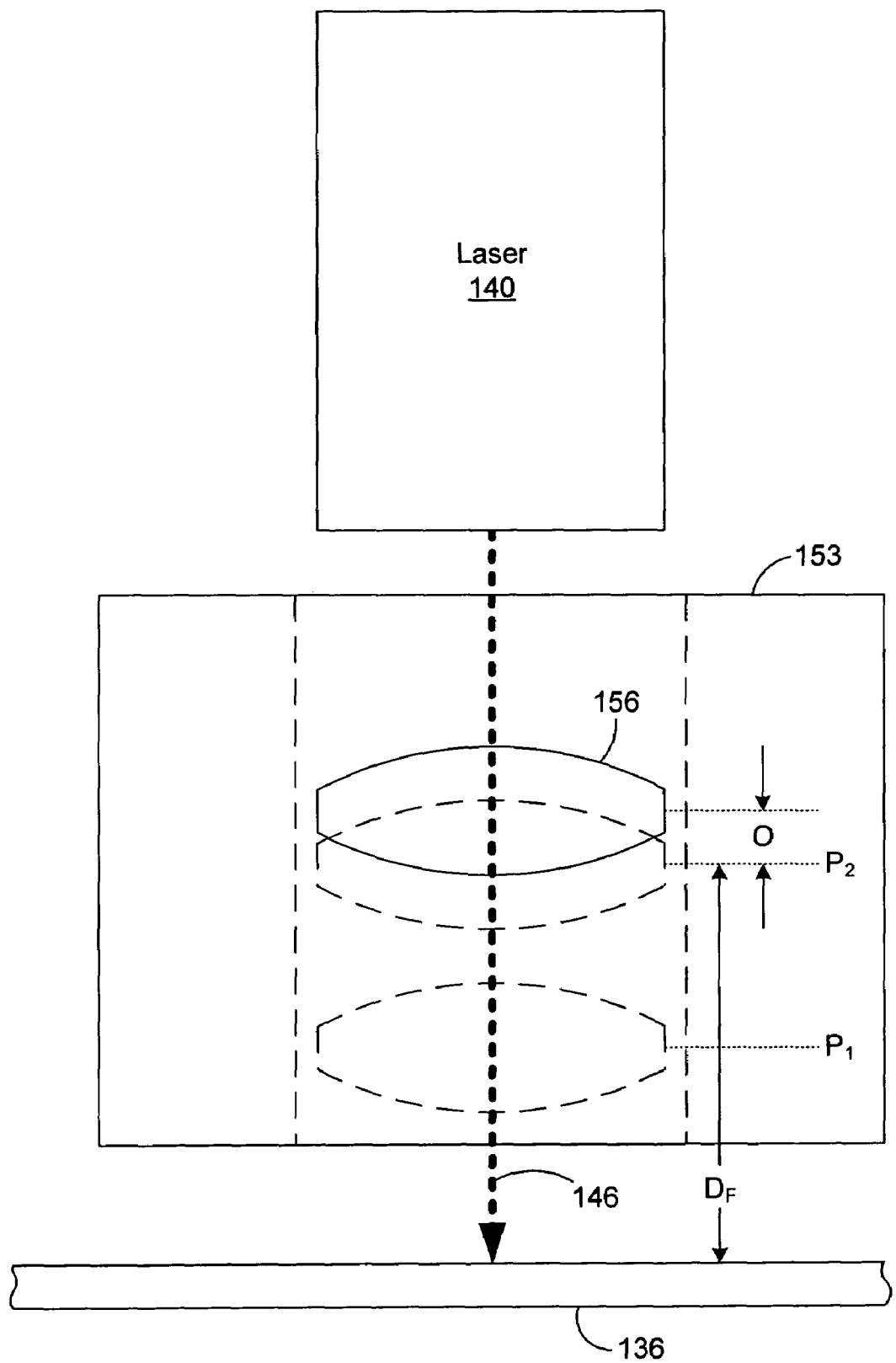
FIG. 2 is a drawing illustrating a lens focus actuator in the optical disc drive of FIG. 1 that adjusts a position of a lens relative to a surface of an optical disc according to an embodiment of the present invention.

Referring then to FIG. 2, shown is a drawing of a view of the laser 140, the lens focus actuator 153, the lens 156, and the optical disc 136 to illustrate the positioning of the lens 156 by the lens focus actuator 153 according to an embodiment of the present invention. As shown, the lens 156 may be positioned along an axis that generally parallels the direction of the laser light 146 toward the optical disc 136. In order to focus the laser light 146 onto the surface of the optical disc 136, the lens 156 is positioned accordingly.

For example, the lens 156 may be moved from a first position $P_1$ to a second position $P_2$. The second position $P_2$ may be, for example, a distance between the lens 156 and the surface of the optical disc 136 that is equal to the focus distance $D_F$ of the lens 156. Consequently, at the second position $P_2$ the lens 156 focuses the laser light 146 onto the surface of the optical disc 136.

However, such a position is not optimal for the writing of a label onto the surface of the optical disc 136. In particular, it is desirable to position the lens 156 by the predefined offset O, relative to the second position $P_2$, where the distance of the lens 156 from the optical disc 136 at the second position $P_2$ is approximately equal to the focus distance $D_F$ of the lens 156.

Thus, in order to position the lens 156, for example, from the first position $P_1$ to the second position $P_2$, the input setting applied to the lens focus actuator 153 that directs the position of the lens 156 is changed from a first value to a second value. The difference between these two values is defined herein as an "input setting delta" which refers to the change in the input setting itself. Because the gain of the lens focus actuator 153 may vary over time, the lens 156 may move a different distance at different times for a given input setting delta.

For example, for a given input setting delta, the lens 156 may be moved from the first position $P_1$ to the second position $P_2$. Assuming that the first position $P_1$ is the rest position of the lens 156, the ultimate location of the second position $P_2$ for the given input setting delta may vary significantly depending on the variation in the gain of the lens focus actuator 153. Assuming that the input setting delta remained static while the gain varies over time, if the input setting delta were applied to move the lens 156 from the first position $P_1$ to the second position $P_2$, the second position $P_2$ may diverge from the focus distance $D_F$.

Consequently, it is desirable to be able to position of the lens 156 in a manner such that the variation over time in gain of the lens focus actuator 153 does not result in a variation of the actual distance that the lens 156 is moved for a given input setting delta. This is particularly the case, for example, when the lens 156 is moved by the predefined offset O relative to the second position $P_2$, where the distance of the second position $P_2$ from the optical disc 136 is equal to the focus distance $D_F$ of the lens 156. This is because the positioning of the lens 156 at the second position $P_2$ may be determined based upon the maximization of the optical feedback from the optical disc 136. However, the optical feedback from the optical disc 136 when the lens 156 is positioned by the predefined offset O relative to the second position $P_2$ may not accurately reflect the positioning of the lens 156 in a similar manner. Ultimately, the desired offset O is a predefined distance that, once applied relative to the second position $P_2$, the laser light 146 is directed toward the optical disc 136 in a manner that results in optimum label writing on the surface.

In order to ensure that the predefined offset O is not affected by the variation in gain of the lens focus actuator 153, according to the various embodiments of the present invention, the lens focus actuator 153 is manipulated to locate the lens 156 from the first position $P_1$ to the second position $P_2$. At the second position $P_2$, the lens 156 substantially focuses the laser light 146 of the laser 140 onto the surface of the optical disc 136. In one embodiment, the first position $P_1$ may be a rest position of the lens focus actuator 153.

In order to position the lens 156 at the second position $P_2$ such that the laser light 146 is substantially focused onto the surface of the optical disc 136, the lens focus actuator control 169 is configured to locate the second position $P_2$ by identifying the position of the lens 156 in which the amount of reflected laser light 149 (FIG. 1) is substantially maximized, because the reflected laser light 149 is maximized when the laser light 146 is focused on the surface of the optical disc 136. Alternatively, astigmatic lenses may be employed to condition the reflected light that is received by the sensor 143 and provide a focus error signal that indicates whether the lens is in focus or is out of focus by a positive or negative amount. In this manner, the positioning of the lens 156 at the second position $P_2$ is detectable.

When the reflected laser light 149 detected by the sensor 143 (FIG. 1) is substantially maximized, the laser light 146 from the laser 140 is focused on to the optical disc 146. In one embodiment, this process may be performed by impinging the laser light 146 on a location on the optical disc 136 that has not been written to previously as to reflect a greater amount of the light since the unwritten background is of a lighter shade than the labeling marks. Various methods or approaches may then be employed to determine the position of the lens 156 at which the reflected laser light 149 is maximized as can be appreciated by those with ordinary skill in the art. For example, one may employ an iterative approach by "walking" the lens 156 through a number of discrete positions until the maximum reflection is detected. Another approach might involve the integration of reflectivity above and below a given position, and then comparing the values, where the maximum reflectivity is reached when the values are substantially equal. Given that such approaches and methods are known by those with ordinary skill in the art, specific approaches employed are not discussed herein in greater detail.

Once the lens 156 has been moved from the first position $P_1$, such as a rest position to the second position $P_2$ such that the laser light 146 is substantially focused onto the surface of the optical disc 136, then the input setting delta that was necessary to move the lens 156 from the first position $P_1$ to the second position $P_2$ is known. In addition, other details are known about the positioning of the lens 156. For example, the approximate distance between the first position $P_1$ and the optical disc 136 may be known by virtue of design parameters and by experimental measurements taken from a number of optical disc drives 100. In this respect, given that the surface of the optical disc 136 may be slightly warped, the distance may vary. Consequently, in one embodiment an approximate average may be determined from measurements taken at different angular and/or radial positions of the optical disc 136.

Alternatively, the first position $P_1$ may be other than the rest position of the lens 156, if the distance between the first position $P_1$ and the surface of the optical disc 136 may be known or determined empirically or via some other method. For example, the surface of the optical disc 136 may vary depending upon which side is facing the laser 140. In one embodiment, the label side is at the surface of the optical disc 136, whereas the reflective surface within which the digital data is recorded is within (i.e. below the surface of) the optical disc 136. The positions $P_1$ or $P_2$ may correspond to a focal distance to the external label surface or the internal data surface of the optical disc 136.

Similarly, the focus distance $D_F$ of the lens 156 is known, typically from the design parameters of the optical disc drive 100. To the extent that process variation results in variation of the focus distance $D_F$ (i.e. the approximate distance from the second position $P_2$ to the optical disc 136), average values may be determined empirically. The focus distance DF is therefore equal to the distance from the second position P2 to the label surface of the optical disc 136 at which the reflected laser light is a maximum.

Therefore, once the focus distance $D_F$ of the lens 156 and the approximate distance from the first position $P_1$ to the surface of the optical disc 136 are known, the approximate distance between the second position $P_2$ and the first position $P_1$ may be calculated. Knowing the input setting delta employed to move the lens from the first position $P_1$ to the second position $P_2$, the distance or displacement of the lens 156 based upon the given input setting delta may be determined. In this respect, one may discover the actual gain of the lens focus actuator 153.

Thereafter, according to various embodiments of the invention, an input setting delta is determined that corresponds to the predefined offset O of the lens 156. To write a label, the lens 156 is positioned by the predefined offset O relative to the second position $P_2$ of the lens 156, where the second position $P_2$ is the focal position of the optical lens 156 as described above. The input setting delta that corresponds to the predefined offset O of the lens 156 is determined based upon the input setting delta that corresponds to the distance between the first and second positions $P_1$ and $P_2$. In particular, the input setting delta that corresponds to the offset O of the lens 156 may be calculated as follows:

$$\Delta I_{Offset} = \Delta I_{P_1,P_2} \left( \frac{D_o}{D_{P_1,P_2}} \right),$$

where $\Delta I^{offset}$ is the input setting delta corresponding to the predefined offset, $\Delta I_{P_1,P_2}$ is the input setting delta corresponding to the distance between the first and second positions $P_1$ and $P_2$, $D_O$ is the actual predefined offset (distance) desired, and $D_{P_1,P_2}$ is the actual distance between the first and second positions $P_1$ and $P_2$.

It should be noted that variation in the gain of the lens focus actuator 153 does not adversely affect the result of the calculation described above. Once the input setting delta $\Delta I_{P_1,P_2}$ is known, the actual gain of the lens focus actuator 153 under the present operating conditions may be calculated. Once the input setting delta $\Delta I_{Offset}$ that corresponds to the position offset O of the lens 156 is known, the lens 156 may be positioned at the predefined position offset with respect to the second position $P_2$, by placing a value in the register associated with the lens focus actuator 153 that is equal to the value that places the lens 156 at the second position $P_2$ plus the input setting delta associated with the predefined offset O.

By doing so, the lens 156 may be positioned by the predefined offset O relative to the second position $P_2$ in order to write a label onto the surface of the optical disc 136. In this respect, in one embodiment, the writing of the label onto the surface of the optical disc 136 occurs after the lens 156 is positioned at the offset O with respect to the second position $P_2$.

Figure 3:
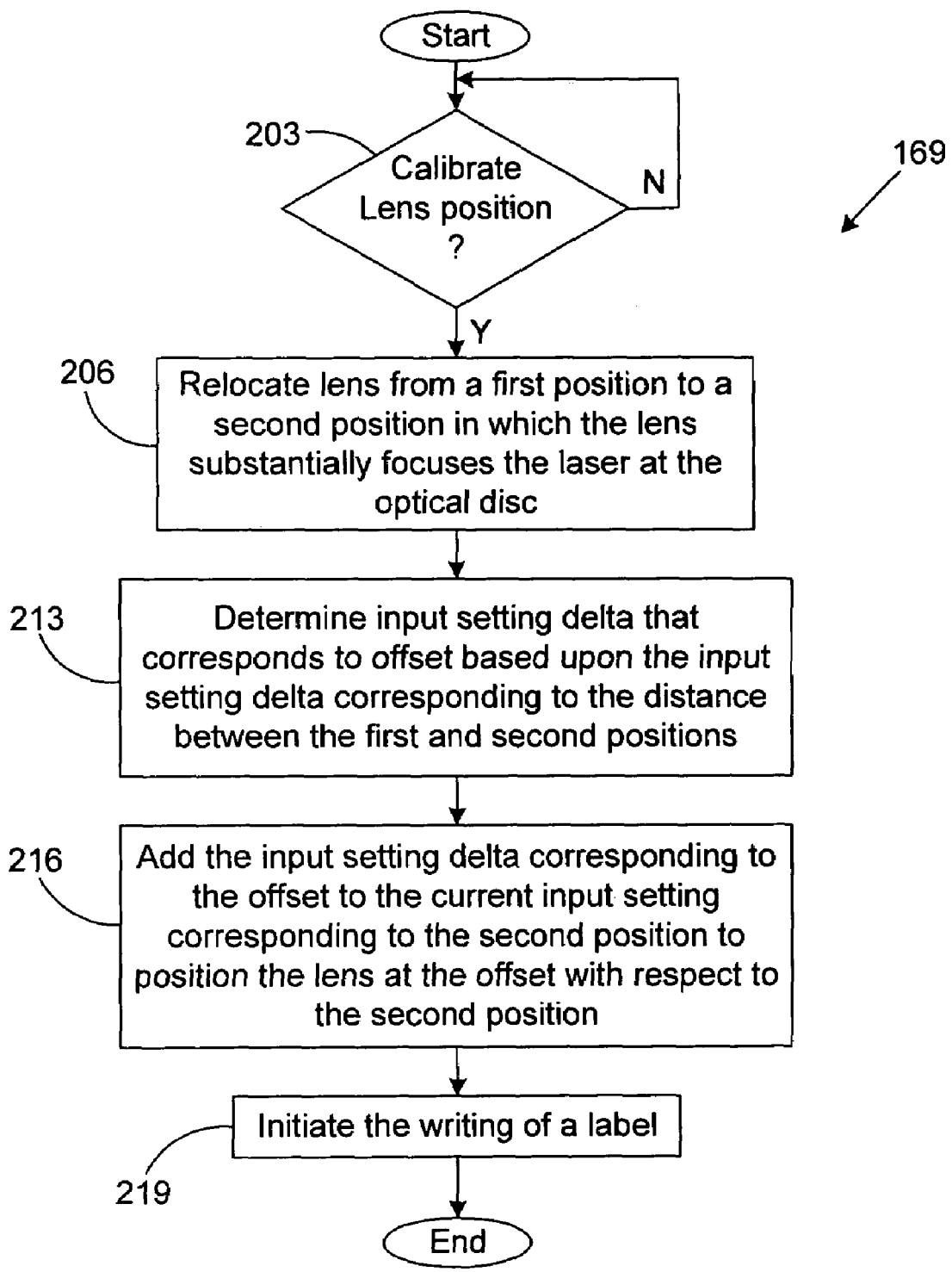
FIG. 3 is a flow chart of a lens focus actuator controller included in the optical disc drive of FIG. 1 that controls the operation of the lens focus actuator of FIG. 2 according to various embodiments of the present invention.

Referring next to FIG. 3, shown is a flow chart that provides one example of the operation of the lens focus actuator control 169 according to an embodiment of the present invention. Alternatively, the flow chart of FIG. 3 may be viewed as depicting steps of an example of a method implemented in the optical disc drive 100 (FIG. 1) to calibrate the position of the lens 156 for writing a label to the optical disc 136 (FIG. 1). The functionality of the lens focus actuator control 169 as depicted by the example flow chart of FIG. 3 may be implemented, for example, in an object oriented design or in some other programming architecture. Assuming the functionality is implemented in an object oriented design, then each block represents functionality that may be implemented in one or more methods that are encapsulated in one or more objects. The lens focus actuator control 169 may be implemented using any one of a number of programming languages such as, for example, C, C++, or other programming languages.

The lens focus actuator control 169 determines whether it is to calibrate the position of the lens 156 according to the various embodiments of the present invention. In one example, the lens focus actuator controller 169 is configured to execute the calibration of the lens position periodically during the writing of a label to the surface of the optical disc 136. Alternatively, the lens focus actuator control 169 may be configured to execute the calibration of the lens position at predefined track intervals during the writing of the label to the surface of the optical disc 136. For example, the lens position may be periodically calibrated between the writing of a predefined number of tracks to the optical disc 136. Alternatively, the calibration may occur after the writing of a predefined number of pixels that partially make up the label as written to the surface of the disc 136. Also, other approaches may be employed to define when it is appropriate to calibrate the position of the lens 156.

The lens focus actuator control 169 may be programmed to make the determination as to when calibration is to take place, or the functionality that makes such a decision may be executed as some other portion of the disc drive controller 166 (FIG. 1). Assuming that the position of the lens 156 is to be calibrated as determined in box 203, then in box 206, a lens focus actuator control 169 relocates the lens 156 by manipulating the lens focus actuator 153 from a first position $P_1$ (FIG. 2) to a second position $P_2$ (FIG. 2). In one embodiment, this manipulation is performed by applying the corresponding input setting delta to the focus actuator 153. According to various embodiments of the present invention, the second position $P_2$ is one in which the lens substantially focuses laser light 146 (FIG. 1) from the laser 140 (FIG. 1) onto the surface of the optical disc 136. According to another embodiment of the present invention, the first position $P_1$ may be the rest position of the lens 156. In this respect, the approximate or average distance between the first position $P_1$ and the surface of the optical disc 136 is known or may be determined empirically or via some other method as described above.

In relocating the lens to the second position in which the lens substantially focuses the laser light 146 onto the optical disc 136, the lens focus actuator controller 169 may execute logic that locates the second position $P_2$ of the lens 156 relative to the optical disc 136 by adjusting the input setting delta to identify the position of the lens 156 at which an amount of reflected laser light 149 (FIG. 1) detected from the optical disc 136 using the sensors 143 (FIG. 1) is substantially maximized as described above. The distance between the first position $P_1$ and the second position $P_2$ is calculated based upon known distances and the focus distance (FIG. 2) of the lens 156 as described above.

Next in box 213, the lens focus actuator control 169 determines an input setting delta that corresponds to the predefined offset to be applied for writing a label onto the surface of the optical disc 136. According to one embodiment of the present invention the input setting delta corresponding to the predefined offset is determined based upon the input setting delta corresponding to the distance between the first and second positions $P_1$ and $P_2$. Thereafter, in box 216, the lens focus actuator control 169 positions the lens 156 at the predefined offset O (FIG. 2) with respect to the second position $P_2$. In order to do so, the lens focus actuator control 169 adds the input setting delta corresponding to the predefined offset to the input setting that corresponds to the second position $P_2$. Thereafter, in box 219, the writing of the label to the surface of the optical disc 136 is initiated. Then, the lens focus actuator control 169 ends as shown.

Although the lens focus actuator control 169 is embodied in software or code executed by general purpose hardware as discussed above, as an alternative the same may also be embodied in dedicated hardware or a combination of software/general purpose hardware and dedicated hardware. If embodied in dedicated hardware, the lens focus actuator control 169 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 3 shows the architecture, functionality, and operation of an implementation of the lens focus actuator control 169. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow chart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the lens focus actuator control 169 comprises software or code, it can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the lens focus actuator control 169 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for calibrating a position of a lens in an optical disc drive, comprising:
    manipulating a lens focus actuator to relocate the lens from a first position to a second position based on an input setting corresponding to the second position, wherein the lens substantially focuses a laser onto a surface of an optical disc when in the second position; and
    determining a first input setting delta that corresponds to a predefined position offset of the lens, the first input setting delta being determined based upon a second input setting delta corresponding to a distance between the first position and the second position.

2. The method of claim 1, further comprising calculating a gain of the lens focus actuator from the second input setting delta and the distance between the first position and the second position.

3. The method of claim 1, further comprising substantially positioning the lens at the predefined position offset with respect to the second position to write a label onto the surface of the optical disc based on the first input setting delta.

4. The method of claim 3, further comprising writing the label onto the surface of the optical disc after the lens is positioned at the predefined position offset with respect to the second position.

5. The method of claim 1, wherein the manipulating of the lens focus actuator and the determining of the first input setting delta are performed periodically during the writing of a label to the surface of the optical disc.

6. The method of claim 1, wherein the manipulating of the lens focus actuator and the determining of the offset input setting delta are performed at predefined track intervals during the writing of a label on the surface of the optical disc.

7. The method of claim 1, further comprising determining the second position of the lens relative to the optical disc by identifying a position of the lens in which an amount of reflected laser light detected from the optical disc is substantially maximized.

8. The method of claim 1, wherein the first position is a rest position of the lens.

9. The method of claim 1, wherein the second position is a rest position of the lens.

10. A system for calibrating a position of a lens in an optical disc drive, comprising:
    a processor circuit having a processor and a memory;
    a lens focus actuator operatively coupled to the processor circuit, the lens focus actuator controlling the position of the lens relative to a disc surface plane of an optical disc drive; and
    a lens focus actuator controller stored in the memory and executable by the processor, the lens focus actuator controller comprising:
        logic that manipulates the lens focus actuator to relocate the lens from a first position to a second position based on an input setting corresponding to the second position, wherein the lens substantially focuses a laser at an optical disc in the optical disc drive when in the second position; and
        logic that determines a first input setting delta that corresponds to a predefined position offset of the lens, the first input setting delta being determined based upon a second input setting delta corresponding to a distance between the first position and the second position.

11. The system of claim 10, wherein the lens focus actuator controller further comprises logic that positions the lens at the predefined position offset with respect to the second position based on the first input setting delta.

12. The system of claim 11, wherein the lens focus actuator controller further comprises logic that initiates a writing of a label after the lens is positioned at the predefined offset with respect to the second position.

13. The system of claim 10, wherein the lens focus actuator controller is configured to execute the logic that manipulates the lens focus actuator and the logic that determines the first input setting delta periodically during the writing of a label to the surface of the optical disc.

14. The system of claim 10, wherein the lens focus actuator controller is configured to execute the logic that manipulates the lens focus actuator and the logic that determines the first input setting delta at predefined track intervals during the writing of the label to the surface of the optical disc.

15. The system of claim 10, wherein the lens focus actuator controller further comprises logic that locates the second position of the lens relative to the optical disc by identifying a position of the lens in which an amount of reflected laser light detected from the optical disc is substantially maximized.

16. The system of claim 10, wherein the second position is a rest position of the lens.

17. A processor readable medium having processor executable instructions thereon, which, when executed by a processor cause the processor to:
    manipulate a lens focus actuator to relocate a lens from a first position to a second position based on an input setting corresponding to the second position, wherein the lens substantially focuses a laser at an optical disc in an optical disc drive when in the second position; and
    determine a first input setting delta that corresponds to a predefined position offset of the lens, the first input setting delta being determined based upon a second input setting delta corresponding to a distance between the first position and the second position.

18. The processor readable medium having the processor executable instructions thereon of claim 17, which, when executed by the processor further cause the processor to position the lens at the predefined position offset with respect to the second position based on the first input setting delta.

19. The processor readable medium having the processor executable instructions thereon of claim 18, which, when executed by the processor further cause the processor to initiate a writing of a label after the lens is positioned at the predefined offset with respect to the second position.

20. The processor readable medium having the processor executable instructions thereon of claim 17, which, when executed by the processor further cause the processor to locate the second position of the lens relative to the optical disc by identifying a position of the lens in which an amount of reflected laser light detected from the optical disc is substantially maximized.

21. The processor readable medium having the processor executable instructions thereon of claim 17, wherein the second position is a rest position of the lens.

22. A system for calibrating a position of a lens in an optical disc drive, comprising:
means for determining a gain of a lens focus actuator based upon a first input setting delta for the lens focus actuator to relocate the lens from a first position to a second position above a surface of an optical disc, wherein the lens substantially focuses a laser onto the surface of the optical disc when in the second position, the first position being predetermined, the second position being detectable, and the distance between the first position and the second position being predetermined; and
means for determining a second input setting delta for the lens focus actuator that corresponds to a predefined position offset of the lens from the second position, the second input setting delta being determined based upon the gain.

23. The system of claim 22, wherein the lens is substantially positioned at the predefined position offset to write a label onto the optical disc.

24. The system of claim 23, wherein the first input setting delta and the second input setting delta are applied to the lens focus actuator so as to substantially position the lens at the predefined position offset.

25. A method for calibrating a position of a lens in an optical disc drive, comprising:
determining a gain of a lens focus actuator based upon a first input setting delta for the lens focus actuator to relocate the lens from a first position to a second position above a surface of an optical disc, wherein the lens substantially focuses a laser onto the surface of the optical disc when in the second position, the first position being predetermined, the second position being detectable, and the distance between the first position and the second position being predetermined; and
determining a second input setting delta for the lens focus actuator that corresponds to a predefined position offset of the lens from the second position, the second input setting delta being determined based upon the gain.

26. The method of claim 25, further comprising substantially positioning the lens at the predefined position offset to write a label onto the optical disc.

27. The method of claim 26, further comprising applying the first input setting delta and the second input setting delta to the lens focus actuator so as to substantially position the lens at the predefined position offset.

28. The method of claim 25, wherein the determining the gain and the determining the second input setting delta are performed periodically during the writing of a label to the optical disc.

29. The method of claim 25, wherein the determining the gain and the determining the second input setting delta are performed at predefined track intervals during the writing of a label on the surface of the optical disc.

30. The method of claim 25, further comprising detecting the second position of the lens by identifying a position of the lens at which an amount of reflected laser light detected from the optical disc is substantially maximized.

31. The method of claim 25, wherein one of the first position and the second position is a rest position of the lens.

* * * * *